United States Patent [19]

Kuhlmann

[11] Patent Number: 5,570,657
[45] Date of Patent: Nov. 5, 1996

[54] ARRANGEMENT FOR BREEDING POULTRY IN CAGE BATTERIES

[76] Inventor: Josef Kuhlmann, Konigstrasse 51, D-48366 Laer, Germany

[21] Appl. No.: 500,869

[22] PCT Filed: Jan. 29, 1994

[86] PCT No.: PCT/DE94/00096

§ 371 Date: Jul. 18, 1995

§ 102(e) Date: Jul. 18, 1995

[87] PCT Pub. No.: WO94/18823

PCT Pub. Date: Sep. 1, 1994

[51] Int. Cl.⁶ .......................... A01K 31/04; A01K 31/06
[52] U.S. Cl. ............................................. 119/458; 119/480
[58] Field of Search ............................ 119/17, 21, 22, 119/436, 437, 439, 442, 455, 458

[56] References Cited

U.S. PATENT DOCUMENTS

| | | | |
|---|---|---|---|
| 3,978,819 | 9/1976 | Lovitt | 119/17 X |
| 4,023,530 | 5/1977 | Cobb | 119/17 |
| 4,480,588 | 6/1984 | Holladay et al. | 119/17 |
| 4,768,465 | 9/1988 | Church | 119/22 |
| 5,174,242 | 12/1992 | Takeuchi | 119/22 |

FOREIGN PATENT DOCUMENTS

| | | |
|---|---|---|
| 0088500 | 9/1983 | European Pat. Off. . |
| 2433584 | 1/1976 | Germany . |
| 7109684 | 1/1973 | Netherlands . |
| 7211491 | 2/1974 | Netherlands . |
| 1477343 | 5/1989 | U.S.S.R. . |
| 2103915 | 3/1983 | United Kingdom . |

*Primary Examiner*—Robert P. Swiatek
*Assistant Examiner*—Elizabeth Shaw
*Attorney, Agent, or Firm*—Merchant, Gould, Smith, Edell Welter and Schmidt, P.A.

[57] ABSTRACT

The invention relates to a cage battery (1) for poultry breeding in which the birds are removed by making the actual grid base (8) of the individual cages or cage sections removable, i.e. it may be rolled up, pulled out or folded up, while beneath the grid base (8) there is a conveyor belt (5, 6, 7) capable of removing the birds from the barn.

7 Claims, 4 Drawing Sheets

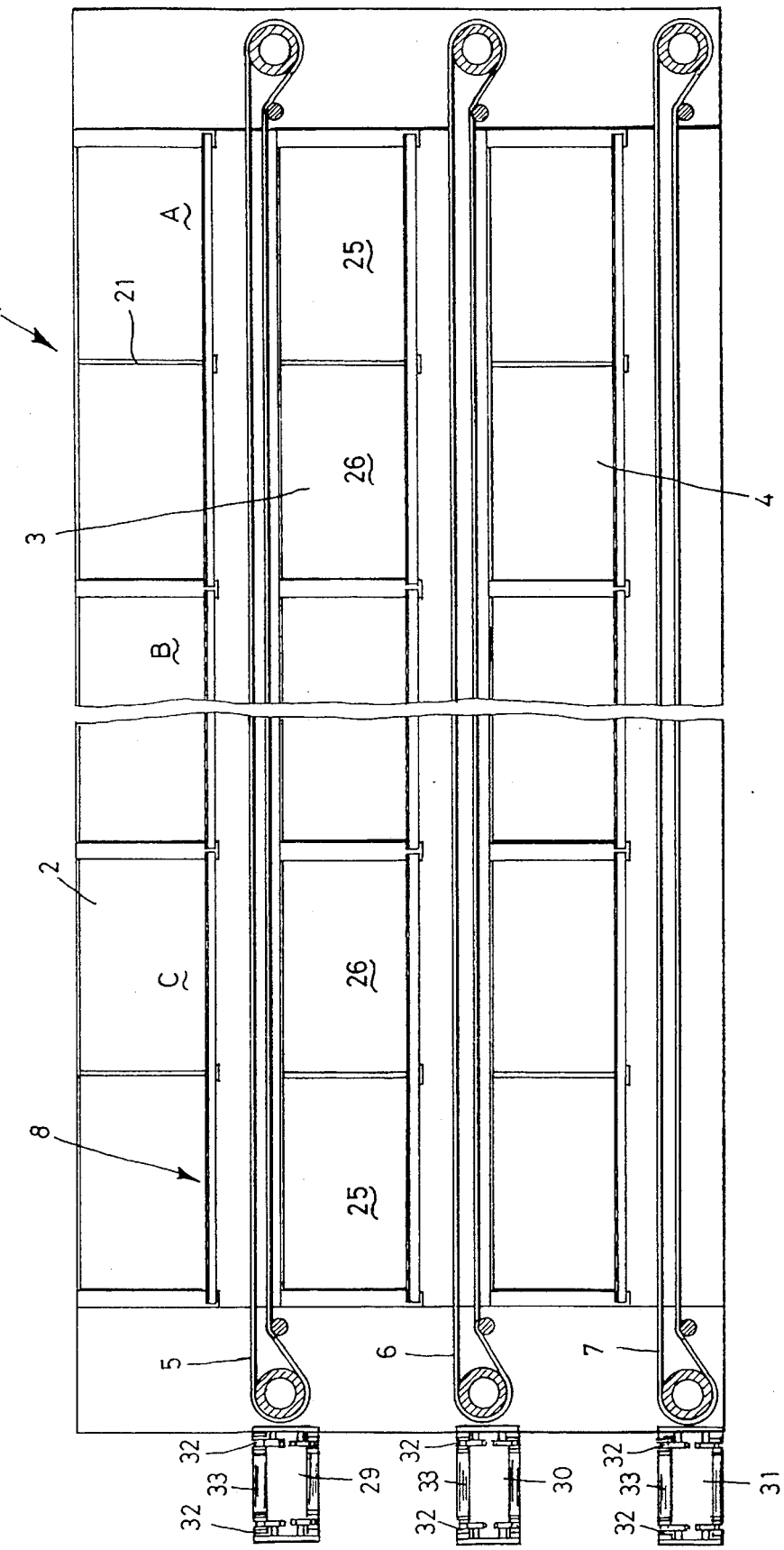

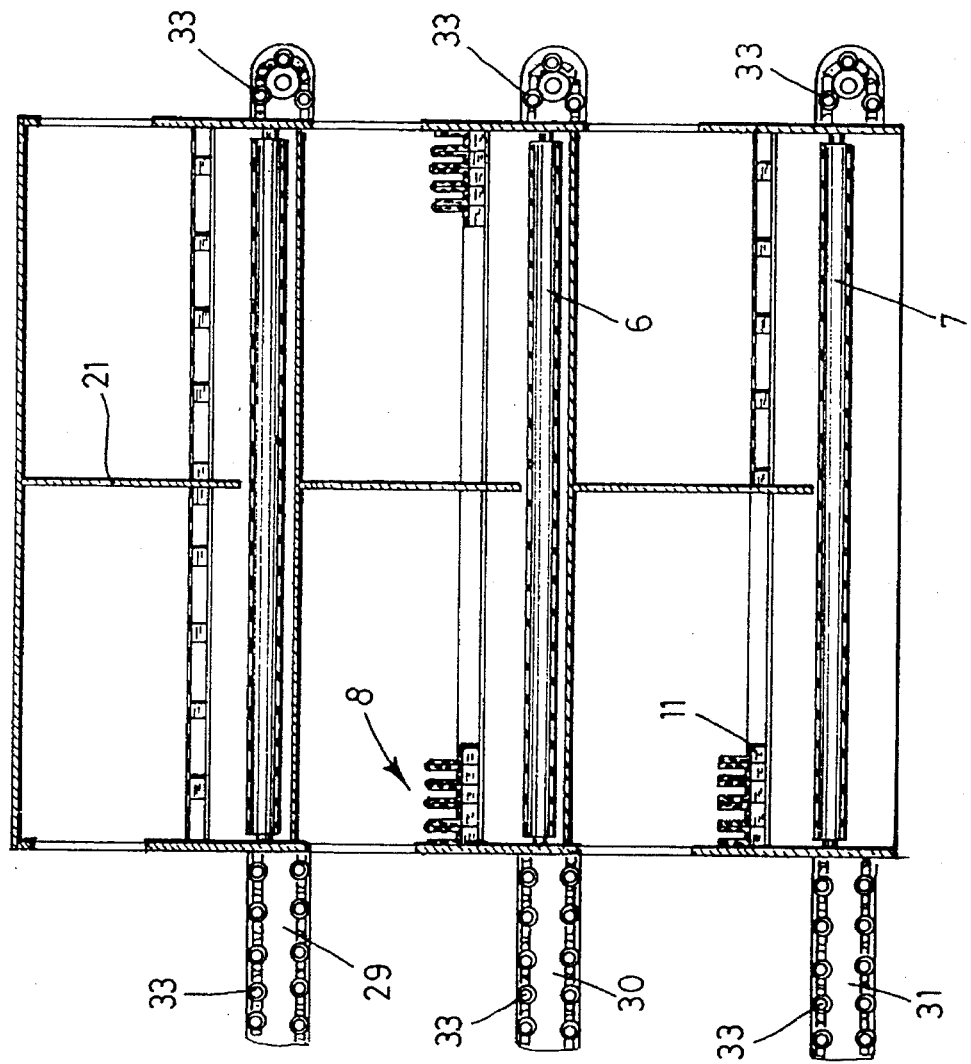

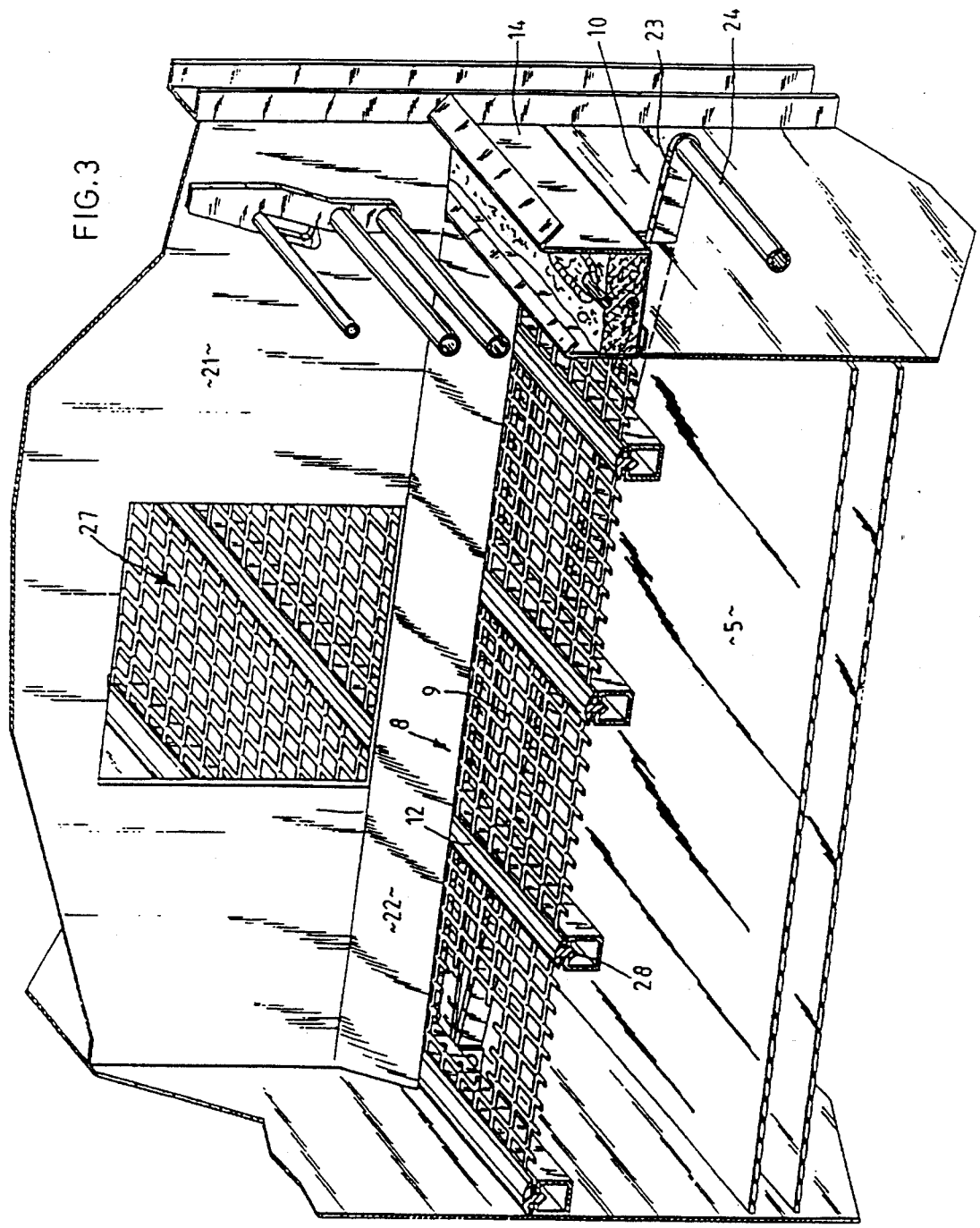

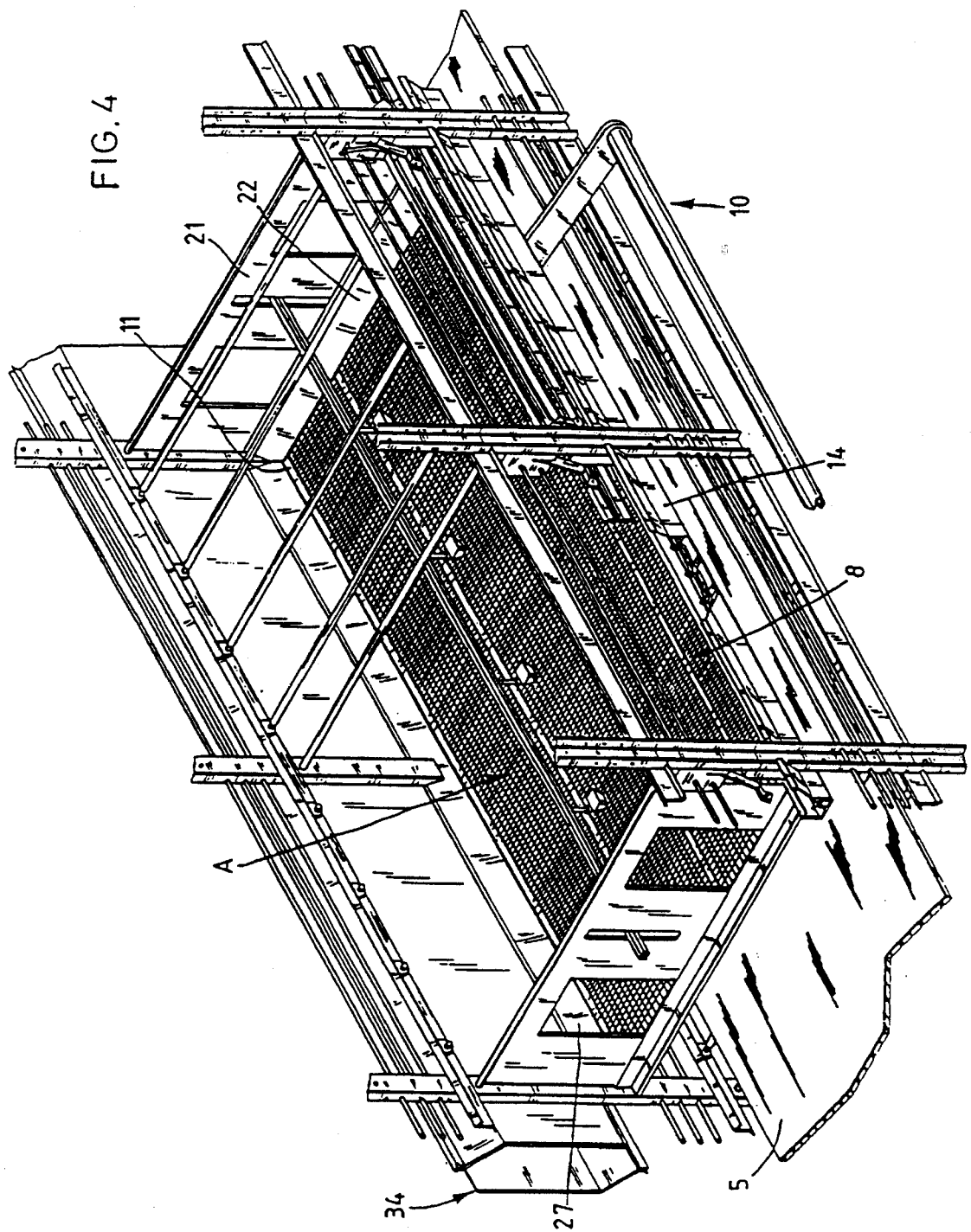

ARRANGEMENT FOR BREEDING POULTRY IN CAGE BATTERIES

The invention relates to an arrangement for breeding poultry as classified in the precharacterizing clause of the main claim.

It is customary nowadays to breed, i.e. to fatten, poultry, for example so-called fattening chickens or broilers, in cage batteries, said poultry being removed from these cages and sent to a slaughter house when they reach the so-called "slaughtering weight".

The classification—defining GB-21 03 915 A discloses a breeding battery in which the grid base comprises a plastic netting which is flexible and consequently adapts well to the animal's body. This grid base is divided into individual sections, which can be connected one behind the other in the longitudinal axis of the rows of cages and can be moved out of the cage by means of a drive, and it is hoped that, with appropriate forward movement of the individual grid bases, the chickens can then be removed at the end of the row of cages. However, the chickens grip the grid base with their claws and removal of the chickens is possible only with the risk of injuring the chickens. This known arrangement thus does not represent a solution to the problem as to how the removal of the animals from a barn can be performed without spending considerable time and without the risk of injury to the animals.

The invention is thus based on the object of simplifying the operation of removal from a barn and providing an apparatus by which the removal from the barn is possible without the risk of injury to the animals.

This object on which the invention is based is achieved by the teaching of the main claim.

Advantageous developments are explained in the sub-claims.

The invention essentially relates to an apparatus for removing fattening chickens or broilers from a barn, the removal operation being simplified by the base, designed in a way known per se as a grid, of the individual cages being pulled away from under the feet of the animals, so that the animals fall from the grid base which was there onto a conveyor belt located beneath. Since the distance from the grid base to the conveyor belt is not very great, this does not cause any great disturbance in the cage, and it is then possible to convey the animals out of the rows of cages by the conveyor belt, otherwise serving as an excrement conveyor belt. It goes without saying that beforehand the excrement conveyor belt is cleared of the excrement otherwise on it. Since the excrement conveyor belt is usually designed as a solid-surface belt and not as a grid belt, like the actual grid base, the animals cannot grip onto the excrement conveyor belt and are thus delivered at the delivery point of the excrement conveyor belt in a very simple way from this belt onto a further-conveying belt, which, according to a further feature of the invention, preferably comprises two mutually parallel arranged guides for roller chains which bear support rods which are arranged at a distance from one another and are aligned transversely with respect to the longitudinal direction of the transporting belt.

Such an apparatus, taken as itself, is known from DE-38 00 817 C1.

According to the subclaims, various measures to remove the grid base are proposed, for example the grid base can be rolled up, it can be pulled out to the front or rear or it can, as is explained subsequently in the exemplary embodiment, be pushed together inside the cage, so that as a result the chickens fall through downwards onto the excrement conveyor belt.

An exemplary embodiment of the invention is explained below with reference to the drawings. In the drawings:

FIG. 1 shows entirely schematically the arrangement of a cage battery, seen transversely with respect to the longitudinal axis of the rows of cages, FIG. 2 shows a schematic representation of the cage battery, but now in the longitudinal axis of the rows of cages, FIG. 3 shows on an enlarged scale the design of the grid base, including handle, and FIG. 4 shows a diagrammatic representation of a cage section.

In the drawings, 1 denotes a cage battery which comprises the individual rows of cages 2, 3 and 4, arranged one above the other. The individual cages of the rows of cages 2, 3 and 4 are bounded on their underside by a grid base 8. Beneath the grid base 8 there runs for each row of cages 2, 3 and 4 in each case a conveyor belt 5, 6 or 7, which normally conveys away to the outside the excrement falling through the grid base of the animals kept in the cages of the rows of cages 2, 3 and 4.

The individual grid bases of each row of cages 2, 3 and 4 are designed as individual sections A, B and C, which follow one another, seen in the longitudinal axis of the rows of cages, which can be handled independently of one another. While in the case of the arrangement represented in FIG. 1, one section of a grid base 8 serves for two cages 25, 26, seen in the longitudinal axis of the rows of cages or of the conveyor belt, it is of course possible to equip more cages with a grid base section A, B or C or to provide such a grid base section A, B or C for each individual cage (FIG. 4).

The actual grid base 8 comprises a plastic netting 9, which rests on a carrier 11, it being so in the case of the exemplary embodiment represented in FIGS. 3 and 4 that the carriers run parallel with respect to the longitudinal axis of the conveyor belt 5 and consequently parallel with respect to the row of cages 2. Individual separating walls 21 between the cages 25 and 26 adjoin, as is illustrated in FIG. 3, the upper side of the actual grid base 8 via a guard wall 22. This reliably eliminates injuries to the animals when the grid base 8 is actuated. In these separating walls 21, separating off the individual cages 25 and 26, there are provided—as Pig. 3 illustrates—through-openings 27, which permit communication of the animals between the individual cages, so that animals can wander from one cage to the other.

The plastic netting 9 is fixed on the carriers 11 by means of press bars 12, which act like push-buttons, the locking-in parts 28 of the press bars 12, which parts engage in the carriers 11, being subdivided, however, such that it is not necessary to interrupt the actual plastic netting 9 completely in the region of the carriers 11 and the press bars 12, but instead the locking-in parts 28 of the press bars 12 pass through the openings of the grid base 8 of the plastic netting, while the upper side [sic] of the press bars 12 are continuous.

Acting on the last carrier 11, situated on the left [sic] in FIG. 3, is a handle 10, which substantially comprises a draw bar 23 and a grip 24, it being possible for the draw bar 23—as is evident in FIG. 3—to be, for example, screwed, welded or hooked on the last carrier 11.

If the grip 24 is then moved to the right in the representation in FIG. 3, the grid base 8, that is to say the plastic netting 9 and the carriers 11, is folded together, and the individual carriers 11 come to bear against one another, as is represented in FIG. 2. Here, in the upper region of FIG. 2, the actual grid base 8 is represented in its position of rest, so that therefore animals can stand on here, while in the two rows of cages 2 and 3 situated beneath the grid base 8 is folded together, so that then the animals otherwise on the grid base 8 pass onto the respectively assigned conveyor belt 5, 6 or 7.

By actuating the handle 10 for the individual grid base sections A, B and C, easy removal from the barn of the animals otherwise standing on the grid bases 8 is then possible. The animals then passing onto the conveyor belt 5, 6 or 7 after removal of the grid base 8 can be carried out by movement of the conveyor belt, there then being provided, according to FIGS. 1 and 2, in the delivery region of the conveyor belt transporting belts 29, 30 and 31. These transporting belts substantially comprise two roller chains 32, between which support rods 33 are interposed transversely with respect to the conveying direction of each transporting belt. Such transporting belts are generally known for the conveyance of eggs in chickens farms.

The animals coming from the solid-surface and smooth conveyor belts 5, 6 and 7 are pleased to come onto the support rods 33, which allow very much their natural urge to grip with the claws of their feet. As a result, troublefree transferring of the animals from the conveyor belts 5, 6 and 7 onto the conveyor belts 29, 30 and 31 is possible.

In the case of the representation in FIGS. 3 and 4, a feeding trough 14 can be seen and in FIG. 4 the ventilation line 34.

I claim:

1. Arrangement for breeding poultry in cage batteries (1), having a grid base (8), which is formed by a flexible netting (9), is subdivided, seen in the longitudinal axis of each row of cages (2, 3, 4), into a sequence of individual sections (A, B, C) which are independent of one another, and excrement collecting devices arranged beneath each row of cages (2, 3, 4), characterized in that the excrement collecting device is designed as a conveyor belt (5, 6, 7) circulating in the longitudinal axis of the rows of cages (2, 3, 4) and the grid base (8) of each section (A, B, C) can be folded together from outside the cages allowing it to be actuated such that it exposes the conveyor belt (5, 6, 7) lying beneath.

2. Arrangement according to claim 1, characterized in that the grid base (8) can be folded together transversely with respect to the longitudinal axis of the rows of cages (2, 3, 4) or of the respective conveyor belt (5, 6, 7).

3. Arrangement according to claim 1, characterized in that the conveyor belt (5, 6, 7) serves as an excrement conveyor belt and, during opening of the grid base (8), as an animal conveyor belt.

4. Arrangement according to claim 1, characterized in that the grid base (8) is formed by a plastic netting (9) which rests on spaced-apart carriers (11) and is connected to the carriers by press bars (12).

5. Arrangement according to claim 1, characterized by a handle (10), which leads from an actuation side outside the cage to an opposite last carrier (11) of the grid base section (A, B, C) and is connected to the latter.

6. Arrangement according to claim 1, characterized in that at the delivery ends of the conveyor belts (5, 6, 7) there are provided transporting belts (29, 30, 31) for the animals, these transporting belts (29, 30, 31) comprising roller chains (32) which are guided in guides and bear support rods (33) which are arranged at a distance from one another and are aligned transversely with respect to the longitudinal direction of the transporting belt.

7. Arrangement according to claim 1, characterized in that the individual cages (25, 26) are separated off from one another by separating walls (21) in which there are provided through-openings (27), through which the animals can wander from one cage (25) to the other cage (26) or vice versa.

* * * * *